United States Patent [19]

Torres

[11] Patent Number: 5,001,697

[45] Date of Patent: Mar. 19, 1991

[54] METHOD TO AUTOMATICALLY VARY DISPLAYED OBJECT SIZE WITH VARIATIONS IN WINDOW SIZE

[75] Inventor: Robert J. Torres, Colleyville, Tex.

[73] Assignee: IBM Corp., Armonk, N.Y.

[21] Appl. No.: 154,546

[22] Filed: Feb. 10, 1988

[51] Int. Cl.$^5$ .................. G06F 3/153; G06G 1/16
[52] U.S. Cl. ........................ 364/521; 364/518; 340/721; 340/723; 340/750
[58] Field of Search ............ 364/518, 521, , 522; 340/724, 706, 731, 723, 747, 750, 798, 799; 382/47, 56

[56] References Cited

U.S. PATENT DOCUMENTS

| | | | |
|---|---|---|---|
| 4,435,703 | 3/1984 | Hunt et al. | 340/723 |
| 4,476,464 | 10/1984 | Hobbs | 340/731 |
| 4,503,427 | 3/1985 | Iida | 340/731 |
| 4,644,319 | 2/1987 | Yamaguchi | 340/731 |
| 4,648,062 | 3/1987 | Johnson et al. | 364/900 |
| 4,656,603 | 4/1987 | Dunn | 364/900 |
| 4,700,320 | 10/1987 | Kapur | 364/521 |
| 4,780,710 | 10/1988 | Tatsumi | 340/721 |
| 4,847,788 | 7/1989 | Shimada | 364/522 |

Primary Examiner—Gary V. Harkcom
Assistant Examiner—Phu K. Nguyen
Attorney, Agent, or Firm—Richard E. Cummins; James H. Barksdale

[57] ABSTRACT

A method to maintain all of the information that is originally displayed in a window on the display screen in an interactive information handling system, as the size of the window is decreased. A plurality of character sets which have different appropriate width and height attributes are stored in the system. When the size of the window is decreased, a stored character set is selected based on the amount that the window is decreased. Characters from the selected set are then substituted for the corresponding text characters originally displayed. Since the selected character set contains proportionally smaller characters no information is lost. The method allows the operator to dynamically vary the window size, after the initial window has been displayed, by operator action, such as by movement of a mouse. Movement of the mouse in a generally horizontal direction with the button in the held position causes the horizontal window size to decrease. The amount of decrease is calculated in real time by monitoring the movement of the mouse and cursor position. A table is stored in memory which lists all of the displayable character sets that are available. Each character set has a width attribute and a height attribute. A percentage decrease in width and height is stored in the table representing changes from the corresponding attributes of the standard character set that is normally used to display information in the system. If the user sizes the window below limits of readability or system capability for resolution, the window components are replaced with a graphic representation of the data or with icons. If the user decides to restore the size of the original, a 1-step key or mouse button sequence is available.

14 Claims, 3 Drawing Sheets

| CHAR. SET NAME | P'NTR | WIDTH | % DELTA | HEIGHT | % DELTA |
|---|---|---|---|---|---|
| DEFAULT CHAR SET | xAC00 | 9 | 0 | 14 | 0 |
| FIRST CHAR. SET | x20AD | 8 | 11% | 13 | 9% |
| FIFTH CHAR. SET | x50CC | 6 | 33% | 10 | 30% |
| SIXTH CHAR. SET | x70FF | 5 | 50% | 7 | 50% |

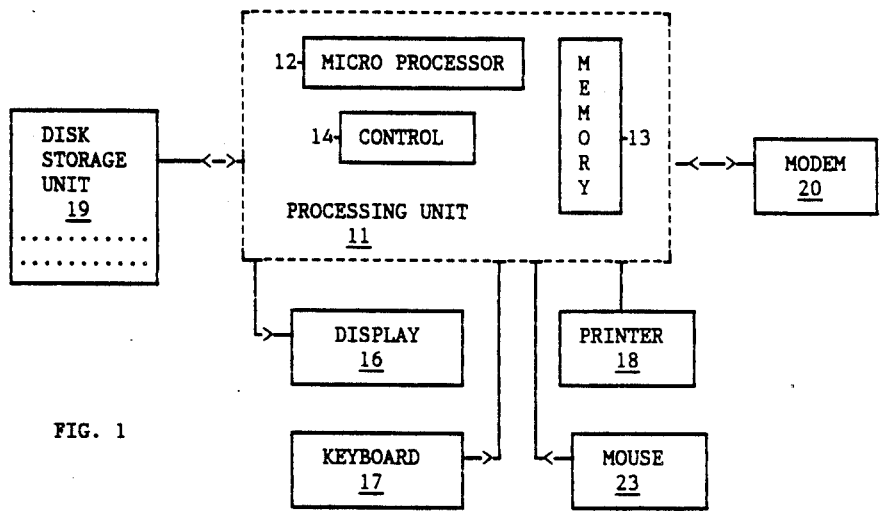

FIG. 1

```
REVISE DOCUMENT|A:DA987015.APP                 |
    34         |Ins  |  |Pg. 21  |Line 8  |Ext. 340-B |Pitch 12  | 100
 31    SAVE     DELETE   COPY     MOVE     GET         HELP        EXIT
..2....|....3....|....4....|....5....|....6....|....7....|....8....|....9....|....
 27
       A problem exists in prior art display systems which permit the
    size of the window to dynamically change when the window contains
    text and one or both of the window's dimensions are shortened. When,
    for example, the width of the window is changed from 40 columns to 30
    columns, the text that was originally on the 40 character line can
    not fit on the 30 character line. One prior art solution attempts to
    solve the loss of data problem by "wrapping" the line around to the
    beginning of the next line. This is of course a limited solution
    since there may be text on all the lines displayed in the window so
    data on the last lines is lost. When the vertical dimension of the
    window is shortened, the problem is compounded since there is no way
    to provide a similar function as word wrapping. The problem is solved
    in some systems by letting the data "scroll" in either or both
    directions. The present invention is directed to an improved method
    for displaying information in the window of a display device in which
    the size of each displayed object is reduced in accordance with the
    reduction of the window so that all of the information that was
    originally displayed is maintained.
 33 _ _ _ _ _ _ _ _

32  F9=COMMAND    F12=SPELL CHECK
```

FIG. 2

```
REVISE DOCUMENT|A:DA987015.APP
               |Ins    |Pg. 21    |Line 8    |Ext. 340-B |Pitch 12  | 100
31    SAVE      DELETE   COPY       MOVE       GET         HELP       EXIT
..2....|....3....|....4....|....5....|....6....|....7....|....8....|....9....|....
27
       A problem exists in prior art display systems which permit the
    size of the window to dynamically change when the window contains
    text and one or both of the window's dimensions are shortened. When,
    for example,  ┌──────────────────────────────────┐ 0 columns to 30
    columns, the │                                  │ ter line can
    not fit on th│                    37            │ on attempts to
    solve the los│                  <---            │ around to the
    beginning of │        30                        │ d solution
    since there m│        ──                        │ the window so
    data on the l│                                  │ nsion of the
    window is sho│                                  │ here is no way
    to provide a │                                  │ oblem is solved
    in some syste│                                  │  or both
    directions.  │                                  │ mproved method
    for displayin└──────────────────────────────────┘ device in which
    the size of each displayed object is reduced in accordance with the
    reduction of the window so that all of the information that was
    originally displayed is maintained.
33
__ _ _ _ _ _ _ _

32  F9=COMMAND    F12=SPELL CHECK
```

FIG. 3

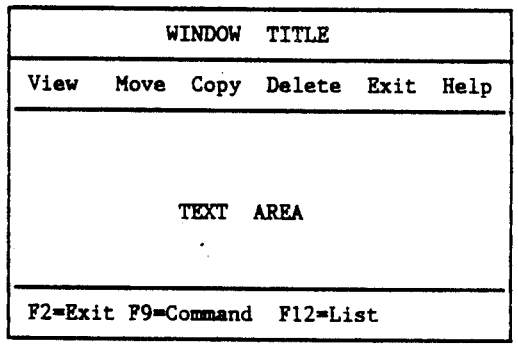

FIG. 4

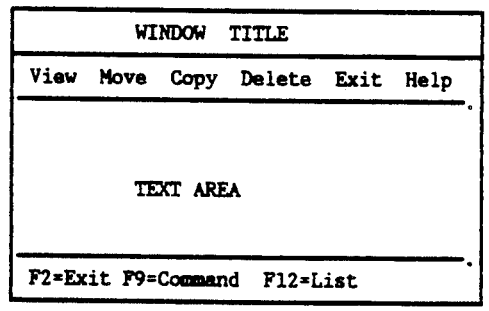
FIG. 5
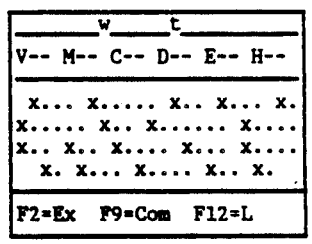
FIG. 6
| CHAR. SET NAME | P'NTR | WIDTH | % DELTA | HEIGHT | % DELTA |
|---|---|---|---|---|---|
| DEFAULT CHAR SET | xAC00 | 9 | 0 | 14 | 0 |
| FIRST CHAR. SET | x20AD | 8 | 11% | 13 | 9% |
| FIFTH CHAR. SET | x50CC | 6 | 33% | 10 | 30% |
| SIXTH CHAR. SET | x70FF | 5 | 50% | 7 | 50% |
FIG. 7

METHOD TO AUTOMATICALLY VARY DISPLAYED OBJECT SIZE WITH VARIATIONS IN WINDOW SIZE

BACKGROUND OF THE INVENTION

1. Field of Invention

This invention relates in general to the display of objects in an interactive information handling system and in particular to a method for automatically selecting the size of an object to be displayed in a "window" on the display in accordance with the size of the window.

2. Description of the Related Art

The prior art discloses various interactive information handling systems. A personal computer, comprising a systems unit, a display device and a keyboard is an example of a simple interactive information handling system. Personal computers are capable of displaying various types of data objects such as text, business graphic objects such as flow charts, pie charts etc, and more complex graphic objects such as two and three dimensional drawings and pictures. The type of objects that may be displayed by a personal computer depends primarily on the display device per se, the adapter board that is controlling the display, and the application program that is run on the system. An article entitled "The IBM Color/Graphics Adapter" by T. V. Hoffmann, beginning on page 26 of the PC Tech Journal, Vol. 1, No. 1, dated July/August, 1983 provides an understanding of some of the general technology considerations that are involved in displaying information in a personal computer system and a detailed understanding of the operation of the IBM color graphics adapter and display device.

In that article three types of display devices are discussed, the monochrome monitor, the color monitor, and a TV monitor. The article also discusses the various operating modes that display system can use in terms of resolution and sets forth some of the defacto standards that have been established in the industry. Some display systems are limited to displaying text in one color. In a typical monochrome system for displaying text, the screen has an 80 column, 25 line format. Each horizontal scan line consists of 720 picture elements, while there are 350 horizontal scan lines. The system is said to have a resolution of 720 by 350. Each of the character columns is 9 pels wide (720/80), while each line of text comprises 14 horizontal scan lines (350/25). A box for each character is therefore defined by a 9 pel by 14 pel area of the screen. Different display systems are available in the art with different resolutions and therefore different character box sizes.

The information that is displayed on the screen is resident in a video buffer that is normally located on the adapter card installed in the system unit. This buffer is continually scanned to refresh the information on the screen at a relatively high rate to avoid any flicker of the screen. The buffer normally includes at least one storage position for each pel on the display screen. The buffer is scanned, i.e. the bit positions addressed and clocked out in synchronization with the horizontal and vertical sweep signals of the display device. Text information e.g. characters and symbols are developed and transferred to the video buffer in at least two different ways. In the first technology, a bit mapped representation of each character in the character set is stored in a Read Only Memory (ROM) on a grid corresponding to the 9 by 14 character box of the display screen. Data entered into the system may be represented by two binary bytes, the first of which selects the particular character in ROM, and the second of which determines certain display attributes for the character such as underlining or blinking. The second general approach employed for developing charactersemploys "software character fonts" which are programs that function to draw the character on the 9 by 14 character box by programming statements. This later approach has the advantage that the character set font, i.e. the appearance of the character, may be changed merely by loading another program, and permits a number of character sets to be stored having different fonts. This is important in those applications which use screen images directly, such as making 35 mm slides for presentations.

The Hoffmann article also refers to the all points addressable (APA) types of display systems which are necessary to display graphics and generally also employ color. The software fonts are used also in the APA display technology and have the advantage of providing a number of different character sets employing different fonts and different sized character boxes on which the character sets are based. Selecting a different character set allows more columns and lines of text to be displayed on a given sized screen.

The prior art also discloses a display technique in which a "window" is created on the display screen which effectively overlays the information that was being displayed. The window area may be blank except for a cursor to indicate a position in the window where some editing action can occur or it may contain information such as a menu which allows the operator to run a completely different application within the window. The windowing display technique has been improved considerably in recent years to permit multiple windows to be created, to permit the location of the window to be moved dynamically from one position on the screen to another using "click and hold" mouse techniques, and to select the initial size of the window and also cause the window size to dynamically grow horizontally and vertically by similar "click and hold" mouse techniques.

A problem exists in prior art display systems which permit the size of the window to dynamically change when the window contains text and one or both of the window's dimensions are shortened. When, for example, the width of the window is changed from 40 columns to 30 columns, the text that was originally on the 40 character line can not fit on the 30 character line. One prior art solution attempts to solve the loss of data problem by "wrapping"the line around to the beginning of the next line. This is of course a limited solution since there may be text on all the lines displayed in the window so data on the last lines is lost. When the vertical dimension of the window is shortened, the problem is compounded since there is no way to provide a similar function as word wrapping. The problem is solved in some systems by letting the data "scroll" in either or both directions. The present invention is directed to an improved method for displaying information in the window of a display device in which the size of each displayed object is reduced in accordance with the reduction of the window so that all of the information that was originally displayed is maintained.

SUMMARY OF THE INVENTION

In accordance with the method of the present invention, all of the information that is originally displayed in a window on the display screen in an interactive information handling system is maintained as the size of the window is decreased by selecting from a plurality of different character sets that are stored in the system, a character set which has the width and height attributes that allow the original text to be displayed with proportionally smaller characters from said selected character set. The different character sets that are stored may be hardware implemented such as ROM character generators based on different sized character boxes or software generated character sets which are also based on different sized character sets. The type of font is important only in the context that some fonts are more readable as the size of the characters decrease than others. The method allows the operator to dynamically vary the window size after the initial window with the default size and screen position has been displayed in response to some predetermined action by the operator. Any of the techniques suggested in the art for changing the window size would be appropriate. In the preferred embodiment of the method, the system includes a "mouse" and the operator captures one side of the window by positioning the cursor adjacent the side while clicking and holding one of the mouse buttons. Movement of the mouse in a generally horizontal direction with the button in the held position causes the horizontal window size to increase or decrease. The amount of decrease is calculated in real time by monitoring the movement of the mouse and cursor position. A table is stored in memory which lists all of the displayable character sets that are available. Each character set has a width attribute and a height attribute which reflects a percentage decrease in width and height from the respective attributes of standard character set that is normally used to display information in the system. As the window decreases in size the characters displayed in the window are replaced by smaller characters that have been transferred to the appropriate bit locations in the video buffer so that none of the data that was displayed in the original window is lost. If the user sizes the window below limits of readability or system capability for resolution, the window components are replaced with a graphic representation of the data or with icons. If the user decides to restore the size of the original, a 1-step key or mouse button sequence is available.

It is therefore an object of the present invention to provide an improved method for displaying information in an interactive information handling system.

Another object of the present invention is to provide an improved method for displaying text data in a window on a display device of an interactive information system.

A further object of the present invention is to provide an improved method of displaying text data in a window on a display device as the window size is decreased.

A still further object of the present invention is to provide an improved display method in which the data displayed in a window on a display device is not lost as the size of the window is decreased.

Objects and advantages other that those mentioned above will become apparent from the following description when read in connection with the drawing.

BRIEF DESCRIPTION OF THE DRAWING

FIG. 1 illustrates an information handling system in which the method of the present may be advantageously employed.

FIG. 2 illustrates the screen of the display device shown in FIG. 1 in normal operation.

FIG. 3 illustrates the screen shown in FIG. 2 after the system has opened a window on the screen.

FIG. 4 illustrates the window shown in FIG. 3 after the operator has entered information into the window.

FIG. 5 ilLustrates the window shown in FIG. 4 after the size of the window has been reduced.

FIG. 6 illustrates the window shown in FIG. 5 after the size of the window had been reduced further.

FIG. 7 is a table for storing information about the stored character sets that are selected for use in the smaller window.

DESCRIPTION OF THE PREFERRED EMBODIMENT

FIG. 1 illustrates the functional components of an interactive type data processing terminal on which the windowing display method of the present invention may be advantageously employed. The terminal comprises a processing unit 11 which includes a microprocessor block 12, a semiconductor memory 13, and a control block 14 which functions to control input/output operations in addition to the interaction between the micro processor block 12 and the memory unit 13.

The terminal further includes a group of conventional peripheral units including a display device 16, a keyboard 17, a printer 18, a disk storage unit 19, and a modem 20. Since the details of the above-described functional blocks form no part of the present invention and can be found in the prior art, only a brief functional description of each block is set forth, along with a description of their interactions, sufficient to provide a person of ordinary skill in the art with a basis of understanding applicants' improved display method.

Processing unit 11 corresponds to the "system unit" of a personal computer system such as the IBM XT, IBM AT and IBM PS/2 personal computer systems. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

Display device 16 and keyboard 17 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 1 further includes a printer 18, which functions to provide hard copy output of data developed or stored in the terminal. A modem 20 functions to transfer data from the terminal of FIG. 1 to a host system through one or more communication links which may be a commercial type link or a dedicated communication link.

Lastly, the system further includes a cursor positioning device such as a mouse 23, which allows the operator to select objects that are displayed on the screen by positioning the cursor adjacent the object and "clicking" a mouse button to signify the object selection. The mouse also allows the operator to select an object and move the object from one position on the screen to another position on the screen by merely keeping the button depressed after the selection and moving the mouse in an appropriate direction and distance and then releasing the button when the object is located at the desired position.

The personal computer may be provided with a display management system with a command bar for the selection of actions, a windowing system, and a multitasking operating system. All of the system requirements listed are conventional and well known in the art and so are not described in detail any further.

FIG. 2 illustrates the screen of text being edited by a text processing program prior to the time when the operator has requested that a window be created on the screen so that he may view some related text from another document. As shown in FIG. 2 the screen has a number of functional areas, which as a general rule assume the same function. For example area 31 is referred to as the command bar and may be used by the operator to call the command rather that typing the command into the system. Area 31 is dedicated to the command bar and while the specific commands that are displayed may very depending on what actions are valid at any particular time, the general function of area 31 remains the same.

In a similar manner Area 32 at the bottom of the screen displays the meanings of the function keys that are valid selections at any point in the processing. The last line at the bottom of the text designated 33 is for displaying messages to the operator. At the very top of the screen the area 34 as shown is used to specify detail information unique to the particular application. In this instance since the application is a text processing task, information on the page number, line number, keyboard extension, and pitch of the character set which will be used to print the document along with the name of the document. The main part 27 of the display area is employed for displaying the display object, which in this instance is text.

FIG. 3 illustrates the screen shown in FIG. 2 after a window 30 has been created. For purposes of discussion it can be assumed that the window is created in response to an action by the operator. It should further be assumed that in this instance the objective is to display to the operator requested information in the form of a number of selected screens that would allow the operator to proceed. The most common operations using the Zoomed Down Window are as follows: use the command bar to operate on the user data; insert or directly revise user data in the window; use the command bar, function keys, or other user interface components to interact with the data or the application. Allowable operations also include printing, saving, or copying information.

For the sake of clarity the actual data is not displayed in the window of FIG. 3. The window does have a pointer 37 illustrated. The initial position of the pointer when the application information panel is displayed in a window is inside of the window border. The pointer is typically associated with the window currently active in the system. The pointer is used to perform operations on the window itself or to perform operations on the application information panel displayed in the window. Conventional operations on application information panels are well understood and hence are not discussed in detail.

The size of the original window as shown FIGS. 3 and 4 is 40 columns by 10 text lines, while the size of the display screen is 80 columns by 25 lines. It can be assumed for purposes of the following description that the display device is in text mode and has a resolution of 720 by 350 so that each character that is normally displayed is contained in an area of 9 by 14 pels. The size of the window in pels is 360 (40×9) by 140 (10×14). If the horizontal width of the window is reduced by approximately 75 to 80 percent then considerable data would be lost or the context of the remaining available data would in most instances not be understandable. If however the system, in accordance with the method of the present invention, has stored a plurality of characters sets which are based on a smaller character block width, then the corresponding character can be substituted in the window and none of the information is lost.

FIG. 5 represents the window after it has been reduced in size with the smaller width characters. As shown the height of the window was also reduced from 140 pels to expose more of the underlying text because such a reduction was allowable since the assumption is that the selected character set had a height of only 11 pels. In both FIGS. 4 and 5 the actual text has not been printed since the text per se is not important. Likewise the scale of the window and the text that is printed in merely representative and also does not reflect the actual reductions described in the discussion. It should also be understood that the window 30 may be opened in some applications with the window already filled with text. This could occur for example where the basic application was a spreadsheet and the windowing function was used for providing text annotations to a specific cell on the spreadsheet.

The results of the sizing operation from the first window state to the second window state are as follows:
1. The window elements are reduced, e.g., the window title bar, window borders, command bar, scroll bars, etc. all have smaller dimensions.
2. The application information displayed in the window elements are of reduced size, e.g., information displayed in the command bar, function key area, etc.
3. The application information displayed in the panel body is of reduced size, e.g., text characters, "page image" boundaries, etc.

4. User intent and information are preserved. All components of the window and application data are fully functional. The user can type into the window. The user can select operations from the command bar.

The result of shrinking the window below the level of user readability or system display capabilities is to present a display form which is more graphic or iconic in nature. In this form, shown in FIG. 6, commands in the command bar are displayed in iconic form; application information is displayed in iconic form or optionally, truncation of the information when possible. The "page image" however is still preserved whenever possible. Information that is possible to display is shown without changing representation to iconic or graphic form. If the operator needs to view the actual text again, the window can be enlarged from the iconic size to a point where the full text appears again.

The manner in which the size of the window is reduced is not critical so long as during the process of reduction, the change may be determined. For example, the system could easily be arranged to permit the operator to select the right hand vertical edge of the window and move it to the left as the mouse button is held down. When a desired size is reached then the button is released. In the process a suitable algorithm is computing the percent change and determining from both the original number of characters and the percent change what character set has a width which would allow its characters to be substituted without any loss of data. The results of the calculation are used to select the character set from a table of character set attributes similar to that shown in FIG. 6, that is stored in the system FIG. 6 illustrates one form of the table that is stored in the system. The table as shown includes a column to indicate the designation of the character set, a second column which includes a pointer to the starting address where the character set is stored, a column for storing the pel width of the character or the percentage difference of the pel width relative to the pel width of the characters that are normally displayed. The last column includes a similar figure for the pel height or percentage difference between the pel height of the character set and the pel height of the normal character set.

Set out below is a program written in Program Design Language (PDL) from which a programmer skilled in the art can readily write source code in a computer language such as Basic, Pascal, or C supported by the computer. This program is usable by the computer in sizing windows and the application information displayed in the windows.

START
With start-up of system,

Load start-up programs and operating system
    Load windowing system
    Allocate memory for Program Pointer Table
    Load Program Pointer Table
    Initialize display buffers
    Set up storage for Main Menu
    Call FIND Menu program for Main Menu
    Open window for Main Menu
    Display Main Menu in window If Application Program selected from Main Menu,
Then
    Search Program Pointer Table for Application Program
    Allocate memory for Application Program, buffers, and tables
    Load Application Program
    Initialize buffers and tables
    Call FIND Menu for initial Application Program menu
    Open window for Application Program menu
    Place window on top of window stack
    Create list of existing data tables
    Update Application Program menu with current data
    Update display buffer with Application Program menu
    Call DISPLAY MENU program
    Display initial Application Program menu
    Fetch selection cursor and pointer
    Display cursor on first item in Application Program menu
    Display pointer adjacent to selection cursor CASE OF: Size existing window smaller If selection cursor on window border and
If mouse "press and hold" selected
    If pointer moves with "press and hold" condition
        Call MOVE POINTER program
        Call Display "shadow box" program
        Update display buffer with pointer and shadow box
        Display updated pointer moving with pointer motion
        Display shadow box window moving with pointer motion
If pointer "press and hold" is released after sizing operation and
If new window size smaller than previous window size
    Check display buffer for window element data fit
    Check display buffer for Application panel data fit
    If data does not fit in window,
        Call Zoom Window Program
        Update display buffer with zoomed window
        Erase shadow box in display buffer
        Call Fetch selection cursor and pointer
Call Display Data Program
END Program: Zoom Window
    Call REPLACE POINTER program
    Display updated pointer
    Call Window display program
    Call Shrink Window Elements program
    Call Shrink Data program
    Call Display data program
    Call ERASE window content
    Call DISPLAY MENU program
    Update display buffer
    Display data cursor at original relative location
    Display pointer at original relative location
    Endprogram Program: Shrink Window Elements
    Check new window size from shadow box dimensions
    Calculate new length and width of
    window boundaries
    title bar
    command bar
    panel body
    scroll bar

```
Select size of font and style for title and command
    bars
If new character size smaller than available fonts
    Replace data with iconic form
Endprogram Program: Shrink Data
    Check new panel body size
    Compute % decrease in panel height and width
    Calculate new boundaries for "page image"
    Format new "page image"
    Calculate new font characteristics required (base line,
        mean line, escapement, lines/inch, ...)
    Select initial character font and size from FONT-
        SIZE Table
    Reformat application panel data with new font-size
    (A) If application panel data does not fit,
        Then, select next character font-size in Table
        Then format characters onto new "page image"
    Repeat (A) until a fit is obtained or FONT-SIZE
        Table has no available options
    If new data size smaller than available fonts, then
        replace data with iconic form
Endprogram
```

While applicants have disclosed only a preferred embodiment of the improved method, it will be apparent that changes and modifications may be made therein without departing from the spirit of the invention or the scope of the appended Claims.

I claim:

1. A method of maintaining the information content of symbols displayed in a window on a display device of an interactive information handling system when an operator decreases the size of said window, said method comprising in combination,
    (A) storing a plurality of symbol sets, each set having a plurality of symbols and a different size attribute to permit corresponding symbols in different said sets having the same information content to be displayed in different sizes,
    (B) displaying one of said plurality of symbols from one said symbol set in a first size within said window,
    (C) decreasing the size of said window, and
    (D) automatically substituting for said one displayed symbol, a corresponding said symbol, having the same information content, from another one of said plurality of stored symbol sets having a size attribute which is based on the amount said window is decreased in step (C), whereby the information content of said symbols displayed in said window is maintained when said window is decreased in size.

2. A method of maintaining the information content of symbols displayed in a window on a display device of an interactive information handling system when an operator decreases the size of said window, said method comprising in combination,
    (A) storing a plurality of symbol sets, each set having a plurality of symbols and a different size attribute to permit corresponding symbols in different said sets having the same information content to be displayed in different sizes,
    (B) providing in said system the capability of interactively increasing and decreasing said window,
    (C) displaying symbols in said window from one said symbol set having a first size attribute,
    (D) decreasing the size of said window by said operator interacting with said system,
    (E) automatically selecting another said symbol set based on the amount that said window is decreased in step (D), and
    (F) substituting identical symbols from said another set, for said symbols from said one set that were displayed in step (C), whereby the information content manifested by each of said symbols that were displayed in step (C) is maintained when said window is decreased in size in step (D).

3. A method for an interactive information handling system which includes a display device and a display management function including a windowing program that allows selected character objects from a first character set to be initially displayed in a window and permits the operator to decrease the size of said window displaying said selected character objects, said method comprising the following sequential steps in combination,
    (A) storing a plurality of character sets, each said character set having different width and height attributes,
    (B) creating a window on said display device with said windowing program, and
    (C) automatically selecting one of said plurality of stored character sets when said window is decreased in size based on the amount of said decrease, whereby the character objects from said selected character set may be substituted in said decreased sized window to maintain the information content manifested by said selected character objects that were initially displayed.

4. The method recited in claim 3 in which said step of creating includes the step of displaying a predetermined text presentation in said window.

5. The method recited in claim 3 including the further steps of entering new text into said system after said window is created and displaying said new text in said window.

6. The method recited in claim 3 in which said display management function includes a window sizing program that allows an operator of said system to decrease the size of said window including the further step of,
    (a) decreasing the size of said window with said window sizing program.

7. The method recited in claim 6 in which said system includes a mouse which is functionally interrelated to said window sizing program and in which said step of decreasing includes the further step of said operator selecting a border of said window with said mouse and moving said mouse in a direction and for a distance to cause said window size to be decreased.

8. The method recited in claim 7 further including the step of determining the amount of horizontal and vertical decrease in the size of said window resulting from said step of moving said mouse.

9. The method recited in claim 6 further including the step of storing a table in said system including an entry for each one of said plurality of stored character sets, each said entry including fields for storing height and width attributes of said character set and the address in said system where each set is stored.

10. The method recited in claim 9 in which said window includes a Command Bar component having a plurality of predetermined text commands displayed on said Bar, including the further step of shortening the initial length of said Command Bar as the horizontal width of said window is decreased by substituting text commands employing smaller width characters.

11. The method set forth in claim 10 in which said step of shortening includes the step of selecting from a plurality of different length Command Bars stored in said system, one command bar which has a length that is equal to or less than horizontal width of said resized window.

12. The method recited in claim 11 including the further step of storing said different length Command Bars in said system for use by said window sizing program including at least one Command Bar in which at least one of said text commands is replaced with an icon and said one Command Bar has the shortest length of all said stored Command Bars.

13. The method recited in claim 12 including the further step of selecting said one Command Bar when said amount of decrease indicated by said step of determining exceeds a predetermined value.

14. The method recited in claim 13 including the further step of restoring said window to its original size with said window sizing program in response to a predetermined keyboard operation involving no more than two different keys.

* * * * *